United States Patent
Stockford

(10) Patent No.: US 7,963,537 B2
(45) Date of Patent: Jun. 21, 2011

(54) SUSPENSION UNIT

(75) Inventor: Brian Stockford, Bristol (GB)

(73) Assignee: Horstman Defence Systems Limited, Bath (GB)

( * ) Notice: Subject to any disclaimer, the term of this patent is extended or adjusted under 35 U.S.C. 154(b) by 116 days.

(21) Appl. No.: 12/405,819

(22) Filed: Mar. 17, 2009

(65) Prior Publication Data

US 2010/0237579 A1 Sep. 23, 2010

(51) Int. Cl.
*B60G 9/02* (2006.01)
(52) U.S. Cl. ............. 280/124.128; 280/124.129; 180/24
(58) Field of Classification Search .............. 180/9.1, 180/22, 24; 280/6.157, 124.128, 124.129, 280/124.13, 124.131, 124.132
See application file for complete search history.

(56) References Cited

U.S. PATENT DOCUMENTS

| | | | | | |
|---|---|---|---|---|---|
| 3,459,439 | A | * | 8/1969 | Otto et al. | 280/6.157 |
| 3,614,125 | A | * | 10/1971 | Sinclair et al. | 280/6.157 |
| 4,447,073 | A | * | 5/1984 | Brandstadter | 280/124.129 |
| 4,537,422 | A | * | 8/1985 | O'Rourke | 280/124.129 |
| 4,552,344 | A | * | 11/1985 | Johnson | 267/64.11 |
| 4,700,970 | A | * | 10/1987 | Joseph | 280/124.129 |
| 4,721,327 | A | * | 1/1988 | Chauveau et al. | 280/124.129 |
| 5,324,065 | A | * | 6/1994 | Derrien et al. | 280/124.129 |
| 5,651,629 | A | * | 7/1997 | Wall et al. | 403/2 |

* cited by examiner

*Primary Examiner* — Eric Culbreth
*Assistant Examiner* — Joseph Rocca
(74) *Attorney, Agent, or Firm* — Honigman Miller Schwartz and Cohn LLP

(57) ABSTRACT

A suspension unit comprises a hub about which a suspension arm is pivotable. The hub is secured to a vehicle chassis or hull by means of a connecting element. The connecting element has a flange provided with holes positioned to coincide with pre-existing holes on the vehicle hole or chassis. The suspension unit can thus be retro-fitted to a vehicle in place of an existing suspension unit of a different kind.

8 Claims, 3 Drawing Sheets

SUSPENSION UNIT

TECHNICAL FIELD

This invention relates to a suspension unit, and is particularly, although not exclusively, concerned with a suspension unit for use on a tracked vehicle.

BACKGROUND

A tracked vehicle has a track extending around a series of track guide wheels. At least some of the guide wheels support the weight of the vehicle hull on the section of the track which is in contact with the ground. In this specification, the expression "hull" is used to refer to the main body of the vehicle. The hull serves the same purpose as the chassis of a conventional vehicle, whether or not the chassis is constituted wholly or partially by the bodywork of the vehicle. Consequently, the context of the present invention, the word "hull" is considered to be equivalent to a vehicle chassis.

The track guide wheels which support the weight of the vehicle on the ground need to be connected to the vehicle hull by a suspension arrangement which enables the track guide wheel to move upwardly and downwardly relatively to the hull.

A suspension system is known in which the suspension system comprises an arm which is pivotable relatively to the hull about a pivot axis. A wheel-supporting shaft is carried by the arm at a position away from the pivot axis, for supporting a track guide wheel. A resilient damping arrangement is accommodated within the arm for providing damped resilient resistance to deflection of the arm away from a static position in a direction corresponding to movement of the hull towards the ground.

In the known unit, the arm is supported for pivotal movement on a hub which is secured directly to the vehicle hull. For this purpose, the hull is formed with an array of tapped holes for receiving fasteners, in the form of bolts, which pass through a corresponding array of holes in a flange of the hub into the tapped holes in the vehicle hull.

A problem with such suspension units is that they cannot easily be retrofitted to a vehicle in substitution for a suspension unit of a different type. This is because the holes in the vehicle hull for securing the previous suspension unit will almost certainly not coincide with the array of holes in the hub flange. Consequently, at best, new holes need to be formed in the vehicle hull to coincide with the holes in the hub flange. Even this may be difficult if, for example, one or more of the new holes coincides approximately, but not completely, with one or more of the original holes. In any case, the extra holes in the vehicle hull can weaken it, which is undesirable at the location of the hull at which the suspension unit is fitted, and particularly undesirable in a military vehicle.

SUMMARY OF INVENTION

According to the present invention there is provided a suspension unit comprising a hub and a suspension arm which is mounted on the hub for pivoting movement about an axis of the hub, the suspension arm being provided with a wheel-supporting shaft which is parallel to and spaced from the hub axis, a resilient damping arrangement being accommodated within the suspension arm and including a displaceable element which is connected by a connecting rod to a crank pin supported in the hub at a position spaced from the hub axis, whereby pivoting of the suspension arm about the hub is accompanied by displacement of the displaceable element, the hub being releasably secured to a connecting element which is adapted to be secured to a vehicle chassis.

The hub may comprise a body having a cylindrical outer surface received in a cylindrical opening in the suspension arm.

The connecting element may have a spigot on which the hub body is mounted. The spigot may be offset from the hub axis. The spigot axis and the crank pin axis may be disposed on a common diameter of the hub body on opposite sides of the hub axis.

The hub may be secured to the connecting element by fasteners extending through the hub body. The connecting element may comprise a mounting flange provided with holes for receiving fasteners to secure the flange to the vehicle chassis. The holes may be disposed radially inwardly of an outer periphery of an annular surface of the suspension arm which surrounds the hub with respect to the hub axis.

The suspension arm may have an annular face disposed opposite the flange of the connecting element, and the holes in the flange may be disposed radially inwardly of the outer edge of the annular face.

The present invention also provides a vehicle having a suspension unit as defined above. The vehicle may be a tracked vehicle, with the wheel-supporting shaft carrying a track guide wheel.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
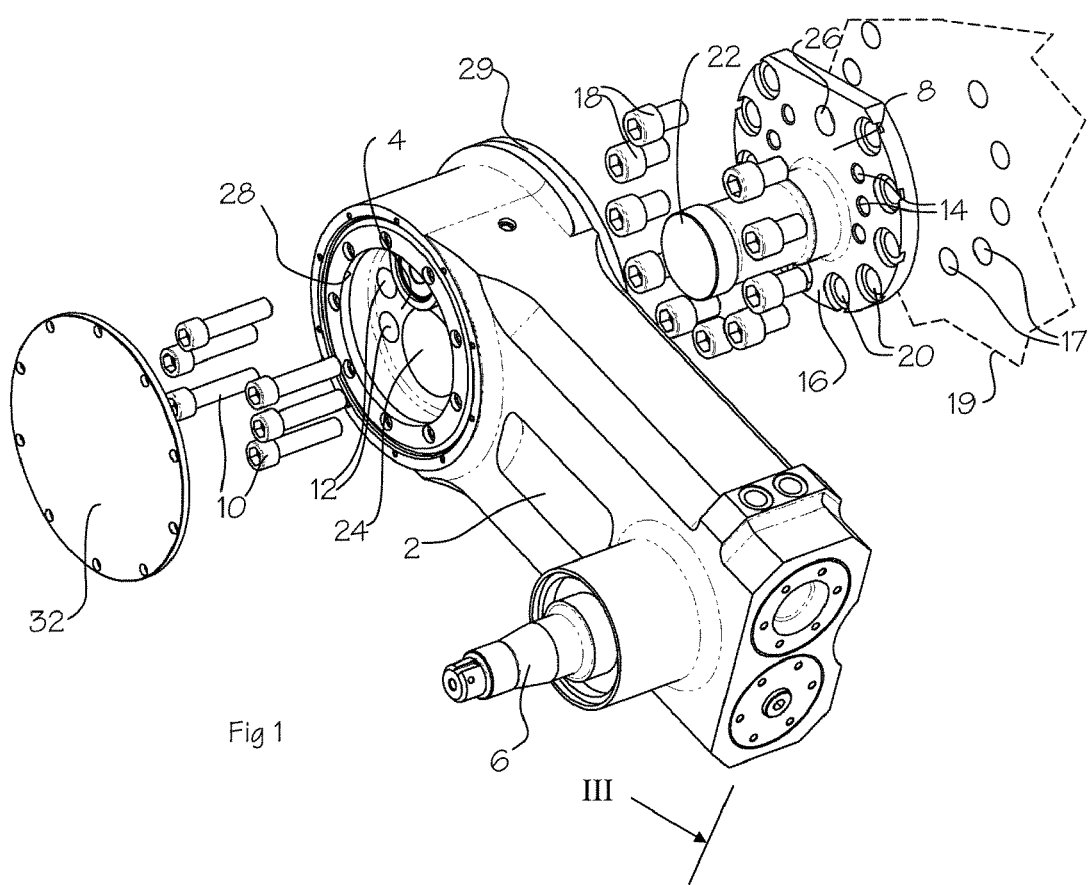
FIG. 1 is an exploded view of a suspension unit.
Figure 2:
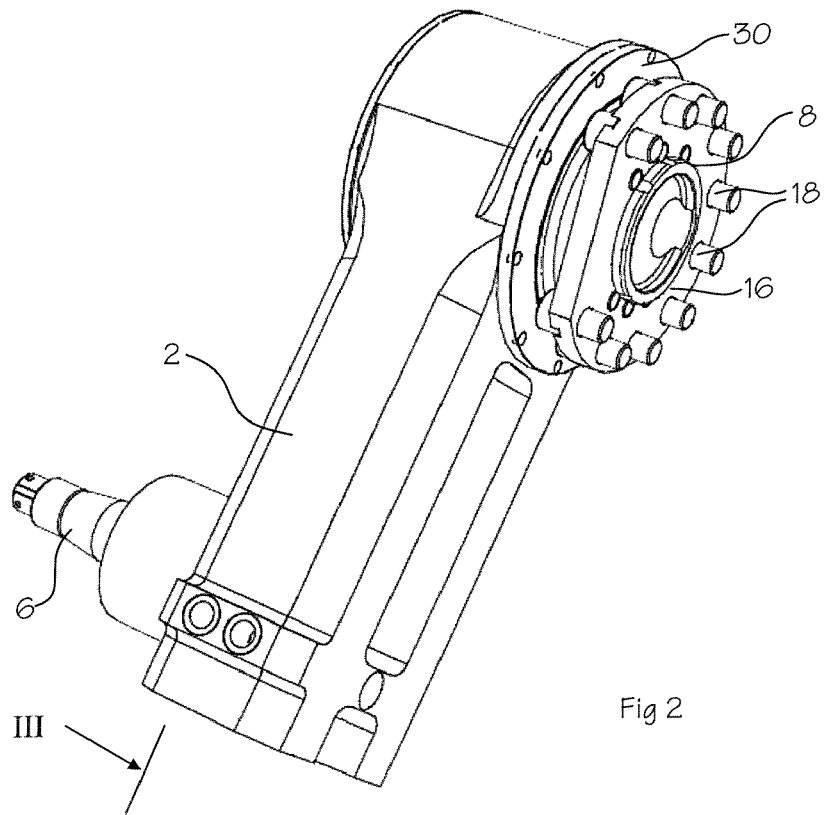
FIG. 2 shows the assembled suspension unit.
Figure 5:
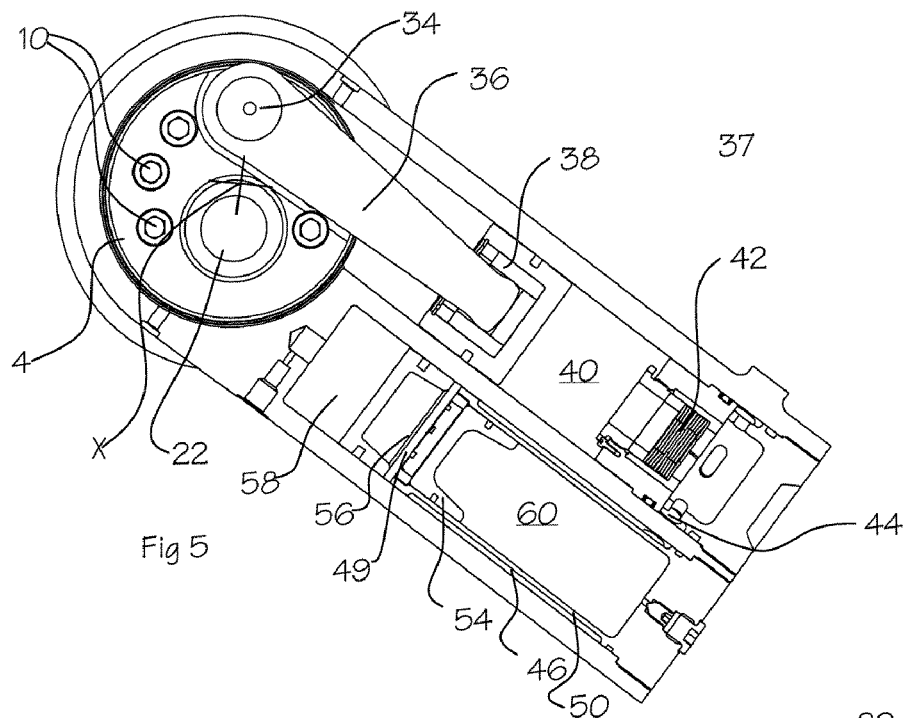
FIG. 5 corresponds to FIGS. 3 and 4 but shows the suspension unit in a rebound condition.
Figure 6:
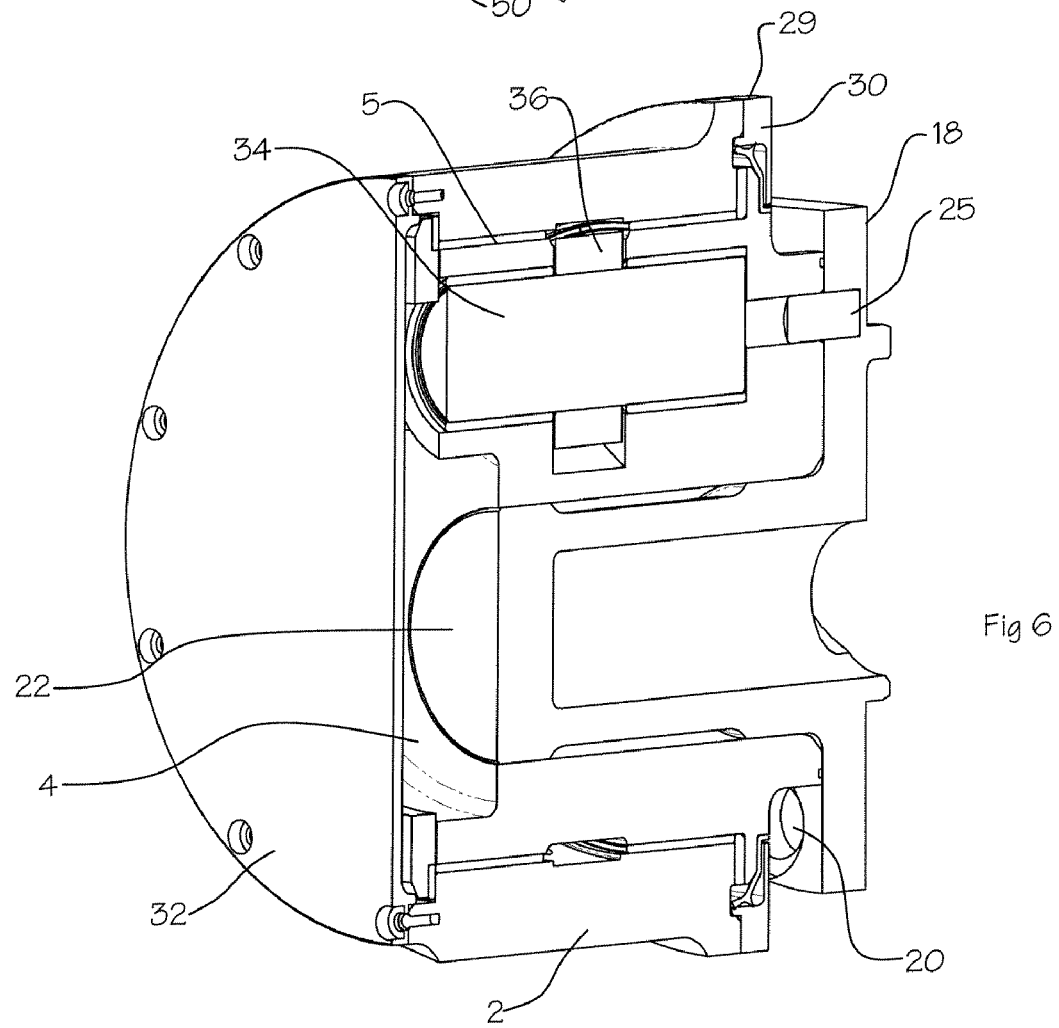
FIG. 6 is a sectional view taken on the line VI-VI in FIG. 5.

As shown in FIGS. 1 and 2, the unit comprises a suspension arm 2 which is rotatable at one end about a hub 4 which comprises a body having a cylindrical outer surface centred on an axis X (FIG. 5). At the other end, the suspension arm 2 is provided with a wheel-supporting shaft 6.

When the suspension unit is mounted on a vehicle, the hub 4 is secured to a connecting element 8. This is achieved by means of bolts 10 which extend through plain holes 12 in the body of the hub 4 into screw threaded holes 14 in a flange 16 of the connector element 8. The connector element 8 is secured to a vehicle hull or chassis (represented diagrammatically at 19) by means of bolts 18 which pass through countersunk holes 20 in the flange 16 into screw threaded holes 17 in the vehicle hull. The holes 20 in the flange 16 are arranged in a pattern which corresponds to that of the holes 17 in the vehicle hull.

The hub 4 is located on the connecting element 8 by means of a spigot 22 which extends from the flange 16 and is a close fit in a cylindrical bore 24 in the hub 4. A dowel 25 (FIG. 5) projects from the hub 4 into a plain hole 26 in the flange 16 to locate the hub 4 rotationally with respect to the connecting element 8.

The cylindrical outer surface of the hub 4 is received in a cylindrical opening 28 in the suspension arm 2. Thus, in use, the hub 4 is fixed to the vehicle hull by way of the connecting element 8, and the suspension arm 2 can pivot about the hub axis defined by the cooperating cylindrical surfaces of the body of the hub 4 and the opening 28.

It will be appreciated from FIG. 2 that the holes 20 for receiving the bolts 18 are disposed on a circle which lies radially inwards of the outer edge 29 of an annular surface 30 of the suspension arm 2 surrounding the cylindrical opening 28. Thus, in use, the bolts 18 are shielded by the suspension arm 2.

The suspension arm 2, with the hub 4 and all other internal components, is pre-assembled and supplied as a unit. The connecting element 8 is adapted for a particular vehicle to which the suspension unit is to be fitted. Thus, the number and positions of the holes 20 are selected to coincide with the number and positions and holes already provided in the vehicle hull for the purposes of securing a different suspension unit. Consequently, if the existing suspension unit is to be replaced by the one shown in FIG. 1, the existing unit is removed, and the connecting element 8 is then secured to the vehicle hull using the existing securing holes. Subsequently, the arm 2, containing the hub 4, is fitted over the spigot 22, and the hub 4, and thereby the entire arm 2, are secured to the connecting element 8 by the bolts 10. The end face of the suspension arm 2 away from the flange 16 is then closed by means of a cover 32.

Figure 3:
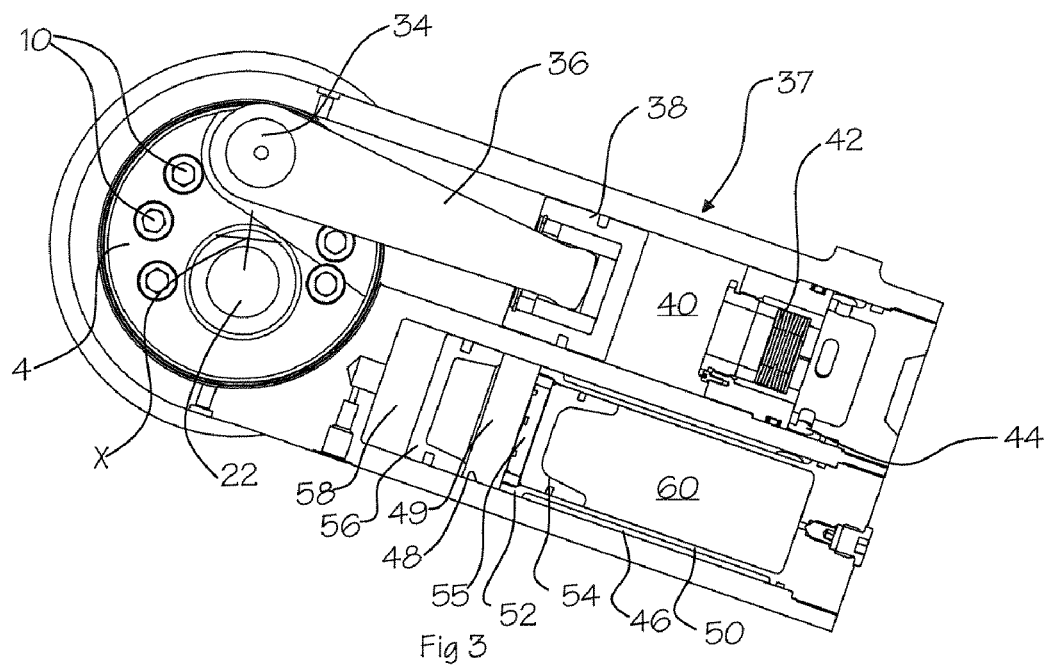
FIG. 3 is a sectional view taken on the line III-III in FIG. 2, showing the suspension unit in a static condition.
Figure 4:
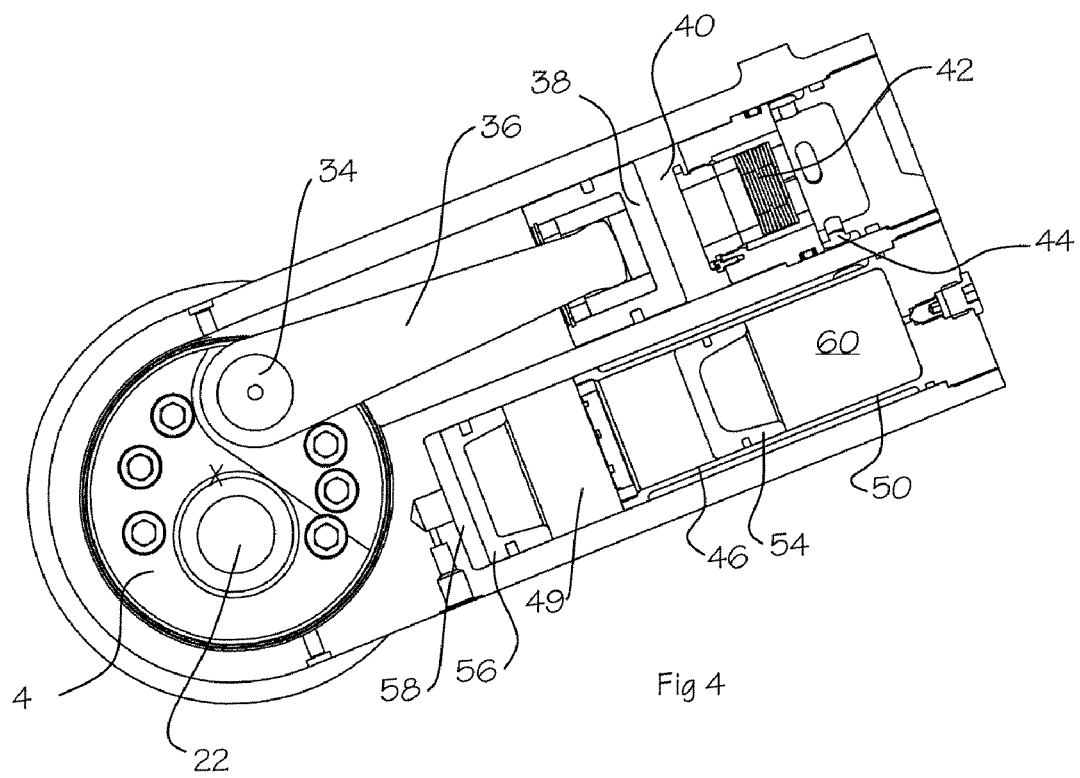
FIG. 4 corresponds to FIG. 3, but shows the suspension unit in a jounce condition.

The suspension arm 2 accommodates a resilient damping arrangement 37 which is shown in FIGS. 3 to 5. The hub 4 carries a crank pin 34 which is connected by a connecting rod 36 to a displaceable element in the form of a piston 38. The piston 38 is slidable in a first cylinder 40 formed in the suspension arm 2.

The cylinder 40 communicates through a damping unit 42 and a passageway 44 with an annular region 46 defined between the wall of a second cylinder 48, disposed parallel to the cylinder 40, and an internal cylinder 50. The internal cylinder 50 extends from one end of the second cylinder 48 to an end portion 52 which is provided at its periphery with axial grooves (not shown) which provide communication between the annular region 46 and the interior of the second cylinder 48.

A second piston 54 is slidable within the internal cylinder 50, and a third piston 56 is slidable within the second cylinder 48. The end position of the second piston 54 is determined by an end stop 55 which is screwed into the end of the internal cylinder 50. The second and third pistons 54, 56 define between them a volume 49 within the second chamber 48. Further volumes 58, 60 are defined respectively between the pistons 56, 54 and the respective ends of the second cylinder 48 and the internal cylinder 50.

For operation, oil or other hydraulic fluid fills the first cylinder 40 to the right of the first piston 38 as seen in FIG. 2, the damping unit 42, the passageway 44, the annular region 46 and the volume 49. Gas, such as nitrogen under pressure, is present in the volumes 58 and 60.

In operation, the suspension unit functions as follows.

In the static condition shown in FIG. 3, the piston 38 is situated approximately midway along the cylinder 40. The pressure of the gas in the volume 60 is sufficient to keep the second piston 54 in contact with the end stop 55 against the pressure generated by the first piston 38 under the static weight of the vehicle, and transmitted to the volume 49 through the passageway 44 and the annular region 46. An increase in the pressure supplied to the volume 58 will drive the third piston 56 towards the internal cylinder 50, displacing oil back to the cylinder 40. Consequently, the height of the vehicle hull above the ground is determined by the pressure of the gas in the volume 58.

Should the vehicle, when travelling, encounter an obstacle above the general level of the surface over which the vehicle is travelling, the track guide wheel mounted on the shaft 6 will rise relatively to the vehicle (i.e. relatively to the hub 4). The resulting jounce condition is shown in FIG. 4. Since the suspension arm 2 has rotated about the central axis of the hub 4, while the hub 4 remains stationary with respect to the vehicle, the piston 38 has moved relatively to the cylinder 40, in a direction towards the damping unit 42. Oil is therefore displaced from the cylinder 40, at a controlled rate determined by the damping unit 42, to the annular region 46, and thence to the region of the second cylinder 48 between the second and third pistons 54, 56.

Initially, displacement of the oil into the volume 49 displaces the third piston 56 to compress the gas in the volume 58. After a predetermined displacement of the third piston 56, the pressure generated is sufficient to compress the gas in the volume 60, and so the second piston 54 will begin to move away from the end stop 55.

Consequently, relatively small displacements of the first piston 38 will be accompanied only by movement of the third piston 56, allowing the unit to operate at a relatively low spring rate during the initial phase of movement. However, with larger deflections of the suspension arm 2, and consequently of the first piston 38, the second piston 54 also begins to move so that, at higher levels of displacement, the unit operates at a higher spring rate.

FIG. 5 shows the rebound condition, in which the track guide wheel mounted on the shaft 6 moves away from the static condition in the direction of increasing distance of the track guide wheel from the vehicle hull. In this condition, the first piston 38 moves away from the damping unit 42, so that oil is drawn from the second cylinder 48 into the first cylinder 40. The second piston 54 returns to abutment with the end stop 55 of the internal cylinder 50, so its position does not change during rebound beyond the static position. Consequently, rebound is accompanied only by movement of the third piston 56, allowing the gas in the end region 58 to expand.

The present invention thus provides a compact suspension unit which can be adapted, by appropriate design of the flange 16 of the connecting element 8, to fit a wide variety of existing fastening hole patterns. The present invention therefore provides a cost-effective replacement unit which can be retrofitted to existing vehicles in place of suspension units of different types.

I claim:

1. A suspension unit comprising:
   a hub;
   a connecting element which is releasably secured to the hub, the connecting element being adapted to be secured to a vehicle chassis;
   a suspension arm which is mounted on the hub for pivoting movement about an axis of the hub;
   a wheel-supporting shaft provided on the suspension arm, the wheel-supporting shaft being parallel to and spaced from the hub axis;
   a crankpin supported in the hub at a position spaced from the hub axis;
   a resilient damping arrangement accommodated within the suspension arm and including a displaceable element which is connected by a connecting rod to the crank pin, whereby pivoting of the suspension arm about the hub is accompanied by displacement of the displaceable element, wherein the hub comprises a body having a cylindrical outer surface received in a cylindrical opening in the suspension arm, wherein the connecting element has a spigot on which the body of the hub is mounted, wherein the spigot is offset from the axis of the hub.

2. A suspension unit as claimed in claim 1, wherein the axis of the spigot and the axis of the crank pin are disposed on a common diameter of the body of the hub, on opposite sides of the axis of the hub.

3. A suspension unit as claimed in claim 1, wherein the hub is secured to the connecting element by fasteners extending through the body of the hub.

4. A suspension unit as claimed in claim 1, wherein the connecting element comprises a mounting flange provided with holes for receiving fasteners to secure the flange to the vehicle chassis.

5. A suspension unit as claimed in claim 4, wherein the suspension arm has an annular face which is disposed opposite the flange of the connecting element, the holes in the flange being disposed radially inwardly of an outer edge of the annular face, with respect to the axis of the hub.

6. A vehicle comprising a vehicle chassis and a suspension unit secured to the chassis, the suspension unit comprising:
- a hub;
- a connecting element which is releasably secured to the hub, the connecting element being secured to the vehicle chassis;
- a suspension arm which is mounted on the hub for pivoting movement about an axis of the hub;
- a wheel-supporting shaft provided on the suspension arm, the wheel-supporting shaft being parallel to and spaced from the hub axis;
- a crank pin supported in the hub at a position spaced from the hub axis;
- a resilient damping arrangement accommodated within the suspension arm and including a displaceable element which is connected by a connecting rod to the crank pin, whereby pivoting of the suspension arm about the hub is accompanied by displacement of the displaceable element, wherein the hub comprises a body having a cylindrical outer surface received in a cylindrical opening in the suspension arm, wherein the connecting element has a spigot on which the body of the hub is mounted, wherein the spigot is offset from the axis of the hub.

7. A vehicle as claimed in claim 6, wherein the vehicle is a tracked vehicle, the wheel-supporting shaft supporting a track guide wheel of the vehicle.

8. A vehicle as claimed in claim 7, wherein the connecting element comprises a mounting flange provided with holes receiving fasteners which engage respective holes in the chassis to secure the flange to the chassis.

\* \* \* \* \*